United States Patent [19]

Shinmoto et al.

[11] Patent Number: 4,655,988

[45] Date of Patent: Apr. 7, 1987

[54] METHOD AND AN APPARATUS FOR COOLING AND GUIDING THERMOPLASTIC SYNTHETIC RESIN FILMS

[75] Inventors: Jitsumi Shinmoto, Yokohama; Takeo Taguchi, Tokyo, both of Japan

[73] Assignee: Tomi Machinery Manufacturing Co., Ltd., Yokohama, Japan

[21] Appl. No.: 775,223

[22] Filed: Sep. 12, 1985

[51] Int. Cl.$^4$ ............................................. B29C 47/90
[52] U.S. Cl. .................................... 264/566; 264/568; 264/569; 264/237; 425/326.1; 425/388
[58] Field of Search ................................ 264/566–569, 264/564–565, 237; 425/326.1, 72 R, 388

[56] References Cited

U.S. PATENT DOCUMENTS

| | | | |
|---|---|---|---|
| 3,344,474 | 10/1967 | Davis et al. | 425/71 |
| 3,507,006 | 4/1970 | Princen | 425/327 |
| 3,544,667 | 12/1970 | Ebert et al. | 264/567 |
| 3,904,342 | 9/1975 | Sato et al. | 264/567 |
| 3,950,466 | 4/1976 | Hasler | 264/567 |
| 3,950,467 | 4/1976 | Yazawa et al. | 264/561 |
| 3,976,733 | 8/1976 | Havens | 264/569 |
| 4,408,970 | 10/1983 | Bostin et al. | 264/569 |
| 4,453,907 | 6/1984 | Taguchi | 264/566 |

FOREIGN PATENT DOCUMENTS

| | | | |
|---|---|---|---|
| 2756039 | 6/1978 | Fed. Rep. of Germany | 264/40.3 |
| 52-7024 | 2/1977 | Japan | 264/567 |
| 58-179621 | 10/1983 | Japan | 264/569 |

Primary Examiner—Jeffery Thurlow
Attorney, Agent, or Firm—C. O. Marshall, Jr.

[57] ABSTRACT

Disclosed herein is a cooling/guiding method and a cooling/guiding apparatus that will be used when a film of a thermoplastic synthetic resin or the like is to be produced by the inflation method or the T-die method.

According to the invention, a thermoplastic synthetic resin film is continuously passed through a section constituted by a single or a plurality of air-introducing members having air intake ports, the air surrounding said film is vacuumed by said air-introducing members so that the pressure differential imparted to the film is balanced, and the film is guided into a predetermined path under the condition where the film is separated away from the air-introducing members.

Therefore, the apparatus cools and guides the film without coming into contact thereto, and without cooling the film irregularly and without marring the film, making it possible to markedly increase the film-forming speed and quality of the film.

3 Claims, 13 Drawing Figures

F I G. 10
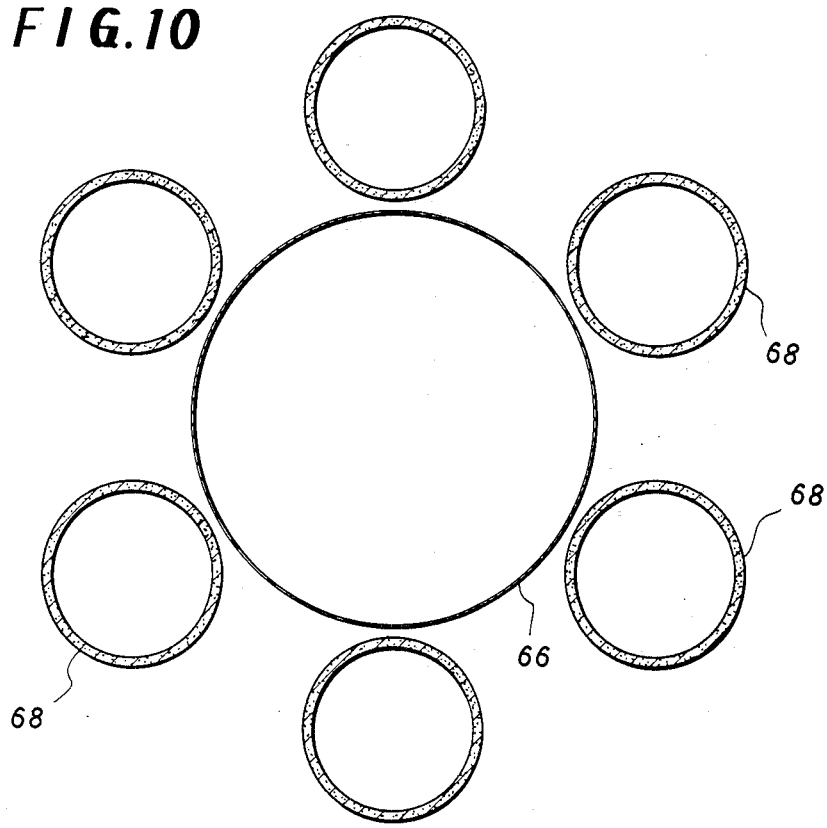
F I G. 11
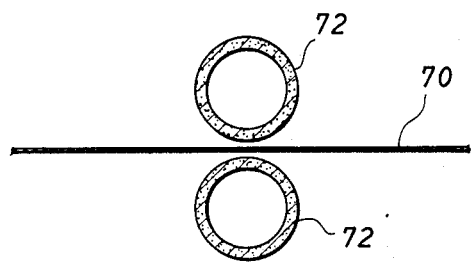

F I G. 12
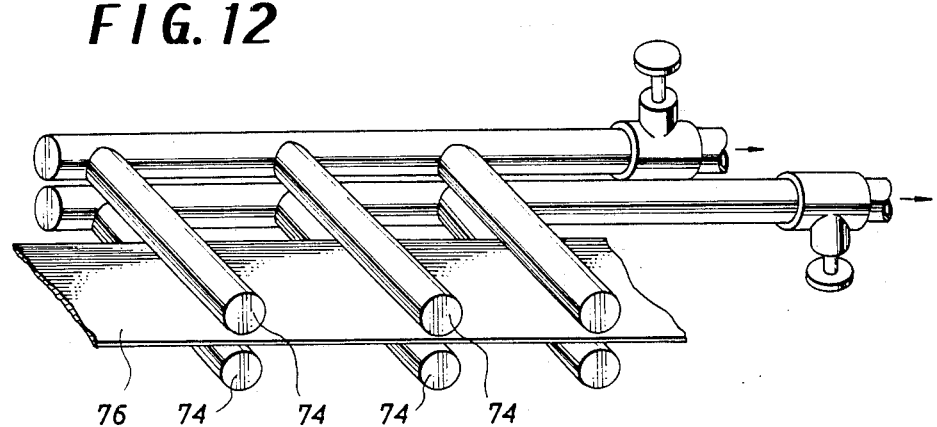
76  74  74  74  74
F I G. 13
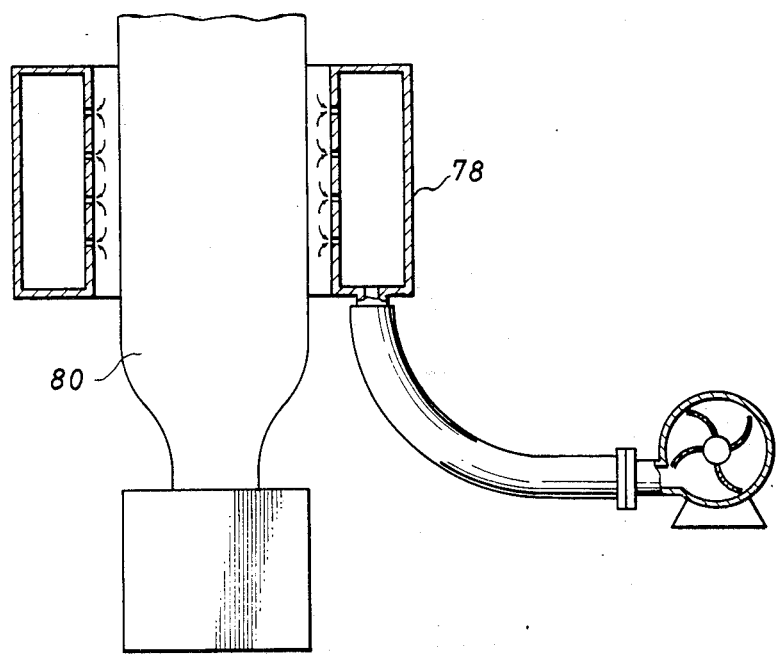

METHOD AND AN APPARATUS FOR COOLING AND GUIDING THERMOPLASTIC SYNTHETIC RESIN FILMS

BACKGROUND OF THE INVENTION

A. Field of the Invention

The present invention relates to a cooling/guiding method and to a cooling/guiding apparatus that will be used when a film of a thermoplastic synthetic resin or the like is to be produced by the inflation method or the T-die method. More specifically, the invention relates to an art in which the film is continuously passed through a section constituted by one or more air-introducing members having air intake ports, the air surrounding the film is intaken by the air-introducing members so that suction imparted to the film is balanced, and the film is guided into a predetermined path so that the film is separated from the air-introducing members.

B. Description of the Prior Art

A molding method such as the inflation method or the T-die method is employed for the production of flat films and bags of thermoplastic synthetic resins (often containing a variety of fillers) such as polyethylene, polypropylene and the like.

First, the inflation method will be roughly described below with reference to FIG. 1. Pellets of a thermoplastic synthetic resin are thrown from a hopper 10 into an extrusion molding machine 12 where they are heated, melted and extruded, and are passed over to a circular die 14. The extruded resin is inflated with the compressed air to form a cylindrical film or bubble 16. The bubble 16 is guided so as not to come out of a predetermined path with the outside thereof being cooled by a cooling/guiding apparatus 18. Thereafter, the bubble 16 is squeezed by stabilizer plates 20 and nip rollers 22, and is finally taken up flat by a winding machine, which is not shown, to obtain a flat film or a bag.

According to a manifold die method which is a representative T-die method, a wide reservoir portion (manifold) is provided at a position where the resin enters into the die from the extruding machine in a direction at right angles thereto, and the resin which is flattened by the manifold is extruded through a linear thin die outlet (lip). The resin is then passed through the cooling/guiding apparatus to obtain a flat film in the same manner as that of the above-mentioned inflation method.

Thus, the cooling/guiding apparatus is required for the inflation method or the T-die method because of the reasons mentioned below. First, to increase the molding speed so as to increase the production efficiency; second, to increase the clarity and strength of the film so as to improve the quality. The third reason stems from the manufacturing standpoint that the film is guided into a predetermined path to take it up maintaining a constant size.

According to U.S. Pat. No. 4,453,907 which discloses a cooling/guiding apparatus invented by one of the inventors of the present invention, there is taught a technique in which an enveloping circle is formed by the combination of a number of conduits, cooling water is passed through the conduits to cool the film that passes in contact with the enveloping circle, and the film is guided into a predetermined path.

According to the above conventional technique in which the film is cooled and guided while in contact with the apparatus (conduits), the film is not uniformly cooled, and thickness of the film varies irregularly. Further, the film is often damaged since it moves at a considerable speed while in contact with the conduits. Moreover, since the film must be brought into contact with the conduits, it is not feasible to increase the speed of travel of the film or to increase the molding speed.

SUMMARY OF THE INVENTION

The principal object of the present invention, therefore, is to obtain an improved cooling/guiding method and an improved cooling/guiding apparatus.

Another object of the present invention is to obtain a cooling/guiding method and a cooling/guiding apparatus that do not develop irregularity in the cooling.

A further object of the present invention is to obtain a cooling/guiding method and a cooling/guiding apparatus with which the film does not come into contact.

For this purpose according to the present invention, the film is continuously passed through a section constituted by a single or a plurality of air-introducing members having air intake ports, the air surrounding the film is taken in by the air-introducing members so that suction imparted to the film is balanced, and the film is guided into a predetermined path so that the film is separated from the air-introducing members.

Other objects of the present invention will become obvious from the following description taken in conjunction with the drawings. The description, however, is to simply explain particular embodiments, and the invention is in no way restricted to those embodiments.

BRIEF DESCRIPTION OF THE DRAWINGS

FIGS. 5 and 6 are plan views illustrating the operation of the cooling/guiding apparatus of the embodiment of FIG. 2, wherein FIG. 5 shows the case where the enveloping circle has a large diameter, and FIG. 6 shows the case where the enveloping circle has a small diameter;

FIG. 10 is a plan view which schematically illustrates a still further embodiment of the present invention;

FIG. 11 is a side view which schematically illustrates a yet further embodiment of the present invention;

FIG. 12 is a schematic diagram showing a further embodiment related to the embodiment of FIG. 11; and FIG. 13 is a schematic side view showing a further embodiment of the present invention.

DETAILED DESCRIPTION OF THE PREFERRED EMBODIMENTS

According to the cooling/guiding method and the cooling/guiding apparatus for cooling a thermoplastic synthetic resin film of the present invention as described earlier, the film is continuously passed through a section constituted by one or more air-introducing members having air intake ports, the air surrounding the film is taken in by the air-introducing members so that suction imparted to the film is balanced, and the film is guided into a predetermined path so that the film is separated from the air-introducing members.

In view of the fact that the bubble-like film is heated to 130° C. and the air surrounding the film is heated to 40° C., the fundamental principle of the invention resides in that the air surrounding the film is positively drawn through the air-introducing members to draw heat from the film, to increase the cooling efficiency. In this case, the internal pressure in the bubble is 2 to 100 mmAq. Therefore, the vacuum pressure by the air vacuum device should be 100 to 3000 mmAq, and preferably 1500 mmAq. In drawing the air, care must be taken to insure that vacuum around the bubble is balanced. This can be accomplished by adjusting the vacuum by means of adjusting valves.

The following description chiefly deals with an embodiment of a section which is constituted by the air-introducing members. It should also be noted that the air-introducing members are very important for the present invention and will be described in the following description.

In a first embodiment of the present invention shown in FIGS. 2 to 6, a section is constituted by an enveloping circle formed by a number of air-introducing members. That is, the upper and lower ends of a number of curved air-introducing members are rotatably supported, and the section of the shape of an enveloping circle formed at a predetermined horizontal position by the air-introducing members is allowed to be changed by relatively turning the support members at the upper and lower ends.

Figure 4:
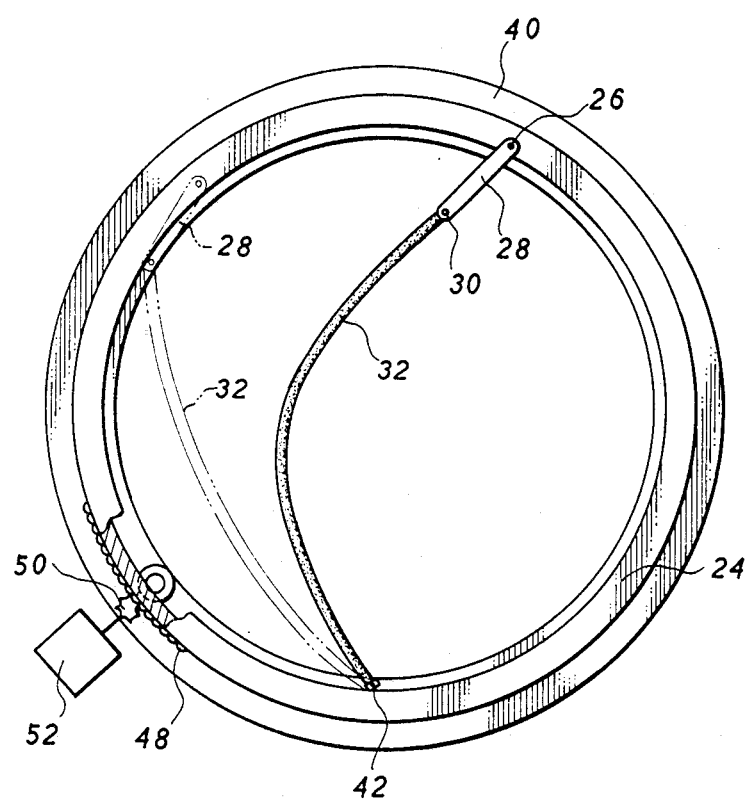
FIG. 4 is a partly cut-away plan view of FIG. 2.

In the drawings, reference numeral 24 denotes an upper rotary ring which may be an annular member or, preferably, a ring-like plate. The surface of the ring is equally divided, for example, into 24 sections, and pins 26 are anchored to the thus divided positions. Ends on one side of links 28 are rotatably supported by these pins 26. Ends on the other side of the links 28 are coupled to the upper ends of curved air-introducing members 32 by upper joints 30 that are rotatable relative to the links 28. Accordingly, the upper rotary ring 24 rotatably supports the upper ends of many curved air-introducing members 32 via link means such as links 28, pins 26 and upper joints 30 as shown in FIG. 4. That is, in FIG. 4, a solid line represents the case where the air-introducing member 32 is squeezed by the upper rotary ring 24 and link means that cooperate together therewith, and a dotted line represents the case where the air-introducing member 32 is loosened.

Figure 1:
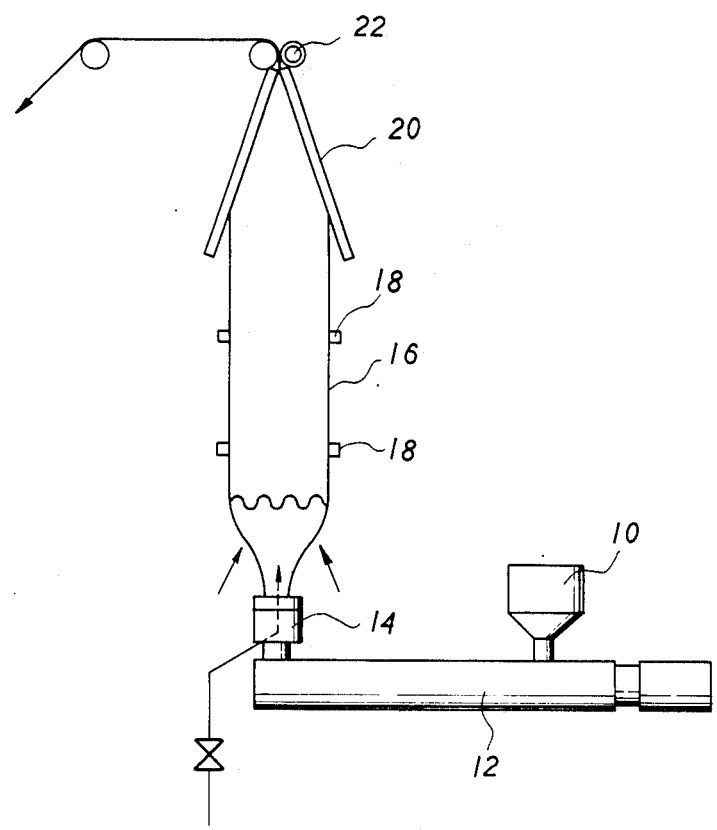
FIG. 1 is a diagram which schematically illustrates an inflation method of producing a film.
Figure 2:
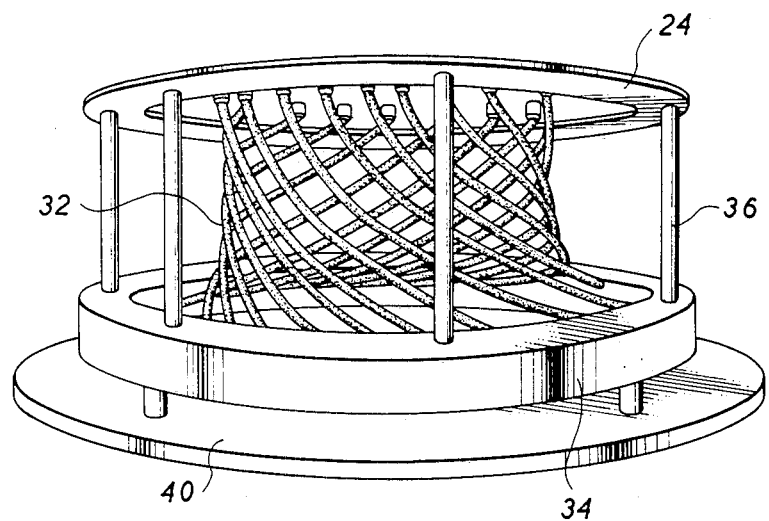
FIG. 2 is a perspective view showing a cooling/guiding apparatus according to an embodiment of the present invention.

A lower rotary ring 34 is provided in parallel with the upper rotary ring 24 maintaining a predetermined distance via a plurality of (for instance, six) upright columns 36. The lower rotary ring 34 also consists of an annular member like the upper rotary ring 24. The bubble shown in FIG. 1 passes inside thereof. A groove 38 is formed in the inner periphery thereof.

An annular lower support ring 40 is provided close to the lower rotary ring 34. A number of lower communication joints 42 (which are rotatable relative to the lower support ring 40 and which are communicated with an air vacuum device that will be mentioned later) are provided at equally divided positions of the lower support ring 40. Lower ends of the curved air-introducing members 32 are coupled to the lower communication joints 42. Here, as clearly shown in the plan view of FIG. 4, a position at which the upper rotary ring 24 (practically the link 28) and the upper end of the air-introducing member 32 are coupled is different, as viewed on a plane, from a position at which the lower end thereof and the lower support ring 40 are coupled as if they were a section of a vortex.

Upright members 44 are studded at a plurality of portions of the lower support ring 40, and roller bearings 46 are provided at the upper ends of these upright members 44, the roller bearings 46 being brought into engagement with the groove 38 formed in the inner periphery of the lower rotary ring 34. Therefore, the lower rotary ring 34 formed as a unitary structure together with the upper rotary ring 24, is allowed to turn relative to the lower support ring 40. The relative rotary mechanism between the lower rotary ring 34 and the lower support ring 40 can be contrived in a variety of other ways. For instance, the lower rotary ring 34 may be placed on the lower support ring 40 via roller bearings.

Figure 3:
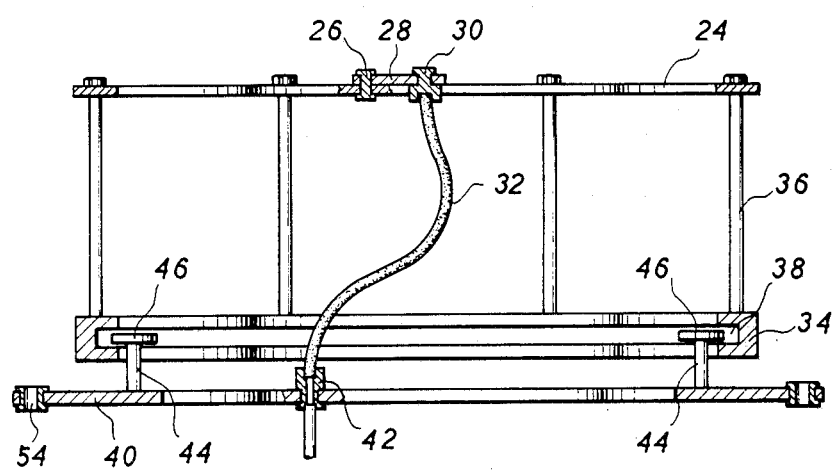
FIG. 3 is a partly cut-away side view of FIG. 2.

FIGS. 3 and 4 illustrate only one air-introducing member 32 representatively among many air-introducing members. The air-introducing member 32 consists of a rigid pipe that is curved in a predetermined shape (twisted like a vortex), i.e., consists of a porous introducing member having numerous fine intake ports communicated with an internal communication path. Described below are currently existing examples of the porous introducing members which are relatively easily available.

(1) Pipe of a porous material.
(2) Filter pipe obtained by winding a mesh-like metal sheet in many layers to form a pipe.
(3) Slit pipe obtained by forming holes or slits in a rigid pipe.
(4) Pipe produced by sintering a metal.

It is evident that these pipes have a relatively large communication path inside thereof to flow the intaken air, and have numerous fine intake ports in the tubular walls thereof.

These fine intake ports are to suck the air surrounding the thermoplastic synthetic resin film. Therefore, they need not exist over the whole periphery of the tubular wall but should rather exist in only those portions directly related to the film from the standpoint of saving power required for the pump that is the air suction device. Accordingly, fine intake ports are left only on the side where the film passes, and other portions may be covered by a silicone coating or a thermally shrinkable tube.

As mentioned above, the upper end of the air-introducing member 32 is rotatably supported by the upper rotary ring 24 via link means such as upper joint 30, link 28 and pin 26, and the lower end is rotatably supported by the lower support ring 40 via a lower communication joint 42 at a circumferential position that deviates from the upper end as viewed on a plane. The number of curved air-introducing members 32 change their curvatures most greatly at positions nearly midway between the upper rotary ring 24 and the lower rotary ring 34.

Figure 5:
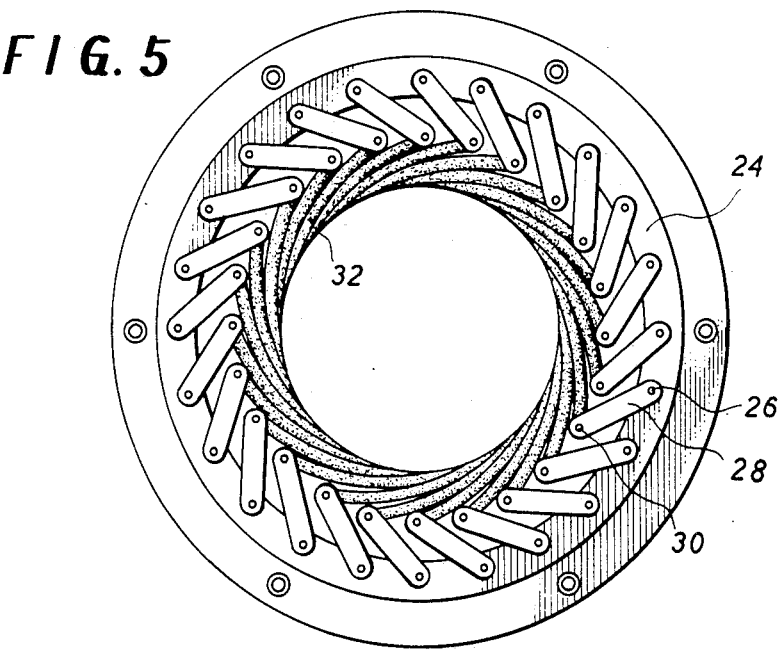
Figure 6:
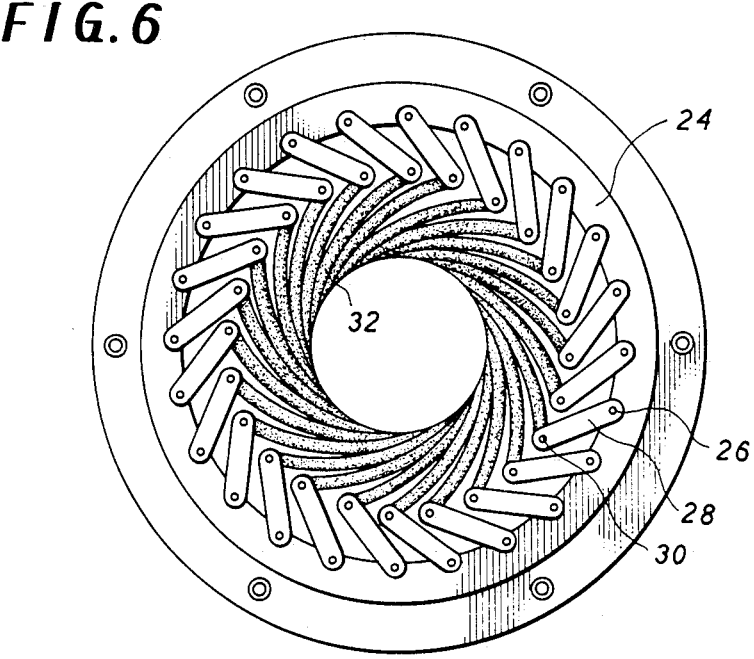

As shown in FIGS. 5 and 6, an enveloping circle formed by the outer peripheries of a number of curved air-introducing members 32, forms a nearly true circle (though it may be a pseudo circle constituted by a set of many line segments) relative to the center (where the bubble passes through) of the apparatus, and the diameter thereof can be changed by turning the upper rotary ring 24 relative to the lower support ring 40.

To realize the relative turning, provision is made for turning means as described below. That is, as schematically shown in FIG. 4, a chain 48 is fitted to the outer periphery of the lower rotary ring 34, and a sprocket 50 that meshes the chain 48 is supported by the lower support ring 40. Further, the sprocket 50 is driven clockwise or counterclockwise by a small motor 52 equipped with reduction means. Owing to the above turning means, the lower rotary ring 34, which is constructed together with the upper rotary ring 24 as a unitary structure, as described already, is turned relative to the lower support ring 40. The turning means can be realized in various other forms. For instance, a rack is formed over a portion of the circumference of the lower rotary ring 34, and a pinion is arranged on the lower support ring 40. The pinion is driven manually or by a motor in the forward direction or in the reverse direction to drive the lower rotary ring 34.

As shown in FIG. 3, furthermore, the lower support ring 40 is provided with a plurality of collars 54 the inside of which being threaded. Therefore, the apparatus of the invention can be arranged in a plurality of stages in the direction in which the bubble proceeds. Namely, upright columns (not shown) with external threads are screwed into the plurality of collars 54, and the upright columns or collars 54 are rotated to ascend or descend the apparatus of the invention stacked in many stages in the direction in which the bubble proceeds, in order to install the apparatus in an optimum cooling and guiding position.

The air surrounding the bubble is vacuumed via the air-introducing members 32 consisting of the above-mentioned porous introducing members, lower communication joints 42, and adjusting valves and conduits that are not shown. The air is vacuumed by the air suction device such as pump that is not shown. Ideally, the air suction device should be capable of arbitrarily changing the vacuum.

Functions and effects of the above embodiment will be described below. The lower rotary ring 34 is rotatably engaged with the lower support ring 40 via roller bearings 46. The lower rotary ring 34 formed together with the upper rotary ring 24 as a unitary structure can be turned by the above-mentioned turning means about the center of the apparatus. Here, a position on the surface of the upper rotary ring 24 at which the upper end of a particular air-introducing member 32 is supported via link means and a position on the surface of the lower support ring 40 at which the lower end thereof is rotatably supported in other words, positions of the upper and lower joints 30, 42 of a particular air introducing member 32 as viewed on a plane, approach each other or move away from each other, as shown in FIG. 4. As shown in FIGS. 5 and 6, therefore, the diameter of an enveloping circle expands or contracts, the enveloping circle being formed by the outer peripheries of many air-introducing members 32 at a predetermined horizontal position (at a point nearly midway between the upper and lower rotary rings 24, 34). The enveloping circle, in practice, is a pseudo circle formed by a set of a number of line segments. As the number of the air-introducing members 32 increases, however, the pseudo circle approaches a true circle. The diameter of the enveloping circle can be maintained constant depending upon the size of the bubble that is to be produced, by stopping the motor 52.

The bubble passing through the enveloping circle maintaining a predetermined gap in the vertical direction (running speed of 40 to 60 meters a minute at a temperature of about 130° C.) is robbed of the heat and is cooled, since the surrounding air heated to 40° C., is sucked through fine intake ports of the air-introducing members 32, and is then properly guided maintaining a predetermined diameter. The vacuum around the bubble is well balanced owing to the presence of a number of fine intake ports and by adjusting the vacuum of the air vacuum device. It is, of course, possible to change the vacuum depending upon the running speed of the bubble and the kind of the synthetic resin.

According to the present invention, the air surrounding the bubble is vacuumed via the air-introducing members having a number of fine intake ports. Therefore, the bubble is uniformly cooled and maintains a constant thickness (30 to 100 $\mu$m) to exhibit improved quality.

Further, the bubble is cooled and guided in a non-contacting manner, and is not vibrated. Therefore, it is possible to markedly increase the speed for forming a bubble of uniform quality.

Moreover, fine intake ports of the air-introducing members 32 are free from clogging, requiring only simple daily maintenance and adjustment.

Furthermore, the degree of cooling and the gap between the air-introducing members 32 and the bubble can be easily adjusted by controlling the sucking pressure.

Figure 7:
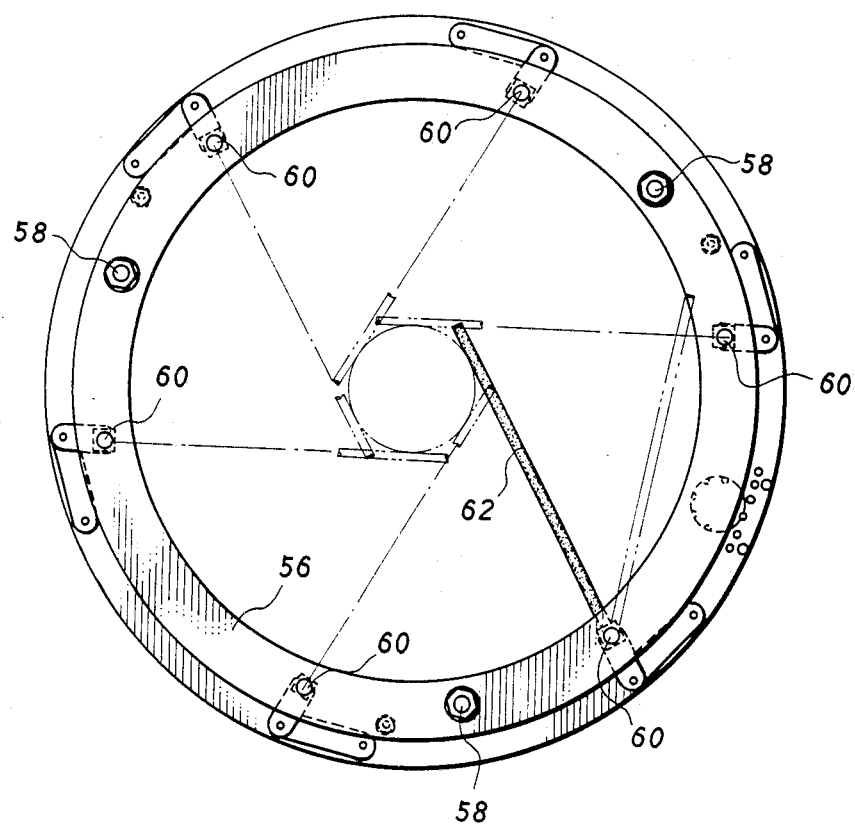
FIG. 7 is a plan view showing the cooling/guiding apparatus according to another embodiment of the present invention.
Figure 8:
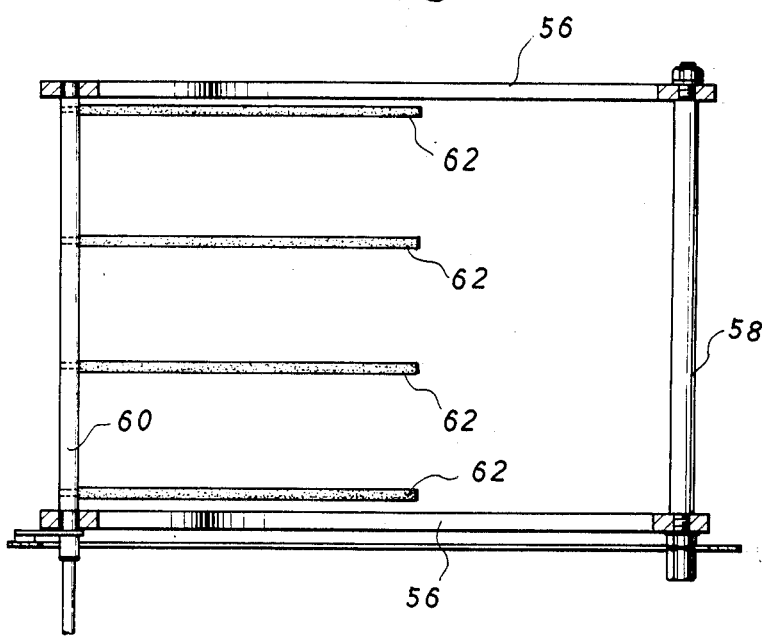
FIG. 8 is a side view of FIG. 7.

FIGS. 7 and 8 illustrate a second embodiment of the present invention. That is, sections for cooling and guiding the film bubble are constituted by many air-introducing members, that are arranged in a plurality of stages on a plurality of horizontal planes at right angles with the direction in which the film runs.

In the drawings, a pair of upper and lower ring members 56 are provided being fastened by coupling members 58. In addition to the coupling members 58, a plurality of support conduits 60 are studded on the pair of upper and lower ring members 56 in the vertical direction. As shown in FIG. 8, these support conduits 60 are rotatable with respect to the ring members 56, and are regularly disposed at six equally divided positions of the ring members 56. The support conduits 60 are hollow and are communicated with the air vacuum device that is not shown. An annular member which is a fundamental frame of the apparatus is constituted by these ring members 56 and support conduits 60.

One or a plurality of air-introducing members 62 are attached at their ends on one side by screws or welding onto the plurality of support conduits at nearly right angles thereto, the plurality of support conduits 60 being erected in the vertical direction in which the bubble runs. These air-introducing members 62 are straight or have their ends curved, and are made of the same materials as those of the aforementioned first embodiment, and have numerous fine intake ports. The plurality of air-introducing members 62 are coupled to the support conduits 60 nearly at right angles thereto, the support conduits 60 being arranged at suitably divided positions on the ring members 56. The plurality of air-introducing members 62 are further located at different heights of the support conduits 60 in the vertical direction, and are horizontally stretched toward the center of the annular member, so that the ends thereof will not come into collision with each other. Side portions of the ends are collected in many numbers about the center of the annular member to constitute a section for cooling and guiding the bubble, as shown in FIG. 7. The air surrounding the bubble is sucked through numerous fine intake ports of the air-introducing members 62 to cool and guide the bubbles in the same manner as in the aforementioned embodiment. In this embodiment, however, the portion for sucking the air is limited. Therefore, a silicone coating or the like should be applied to other portions of the air-introducing members 62.

To change the diameter of the section constituted by the plurality of air-introducing members 62 to cool and guide the bubble, the plurality of support conduits 60 to which the air-introducing members 62 are coupled should be rotated. In this case, however, if the individual support conduits 60 rotate independently of each other, the diameter of the section defined by the side portions of ends of the air-introducing members 62 can not be correctly controlled, as an enveloping circle. Therefore, all of the air-introducing members 62 should be moved simultaneously, equally and horizontally using a suitable link mechanism. A link mechanism of this kind can be implied from the first embodiment. Since it does not pertain to the gist of the invention, it is not described here.

In addition to the above-mentioned two embodiments, the section defined by the air-introducing members can further be realized in a variety of other forms.

Figure 9:
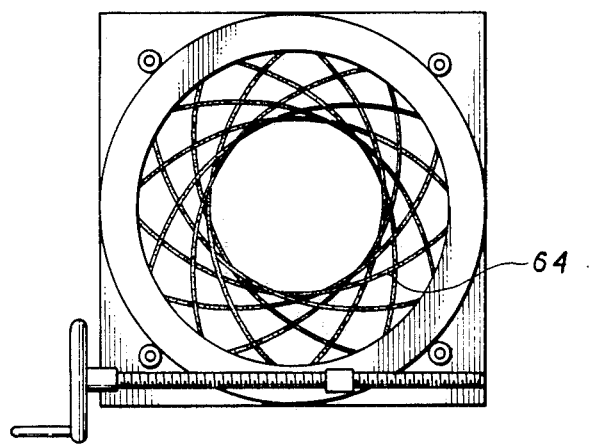
FIG. 9 is a plan view of the cooling/guiding apparatus according to a further embodiment of the present invention.

FIG. 9 is a plan view showing a section constituted by many air-introducing members 64 that are arranged on a horizontal plane at right angles with the direction in which the film runs. With this structure, the diameter of enveloping circle can be changed just like an iris diaphragm of a camera.

FIG. 10 is a plan view showing a fourth embodiment in which the section is constituted by many air-introducing members 68 that are in parallel with a direction in which the film 66 runs, in a direction perpendicular to the surface of the drawing, in this case. That is, the air-introducing members 68 are erected in parallel at positions of equally dividing the circumference. It is, of course, allowable to wholly uniformalize the air-introducing members 68, and to radially move them toward the center of the section or in the opposite direction to vary the diameter of the section.

According to a fifth embodiment shown in FIG. 11, the section is constituted by a pair of opposing air-introducing members 72 between which the film 70 is interposed. Even with this cooling and guiding apparatus which is simply constructed, the film can be cooled and guided in a non-contacting manner by the porous conduits in which the gist of the invention resides.

FIG. 12 illustrates an embodiment which is modified from the embodiment of FIG. 11, and wherein many air-introducing members 74 are alternatingly arranged on the front and back surfaces of the sheet-like film 76, in order to cool and guide the film. The valve works to suitably adjust the vacuum pressure.

FIG. 13 shows an embodiment in which the bubble 80 runs through the inside of air-introducing members 78 that define a constant inner diameter. The apparatus of this type having a fixed diameter is also much used for producing thermoplastic synthetic resin films, and is encompassed in the scope of the present invention.

What is claimed is:

1. A method of cooling and guiding a continuous tubular thermoplastic synthetic resin film comprising the step of passing the film continuously through a cooling and guiding sleeve having air intake ports distributed throughout the interior of the sleeve, while applying suction to each of the intake ports to draw air into the ports, and balancing the amount of suction applied to the various intake ports to maintain the tubular film centered in the sleeve so as to prevent the tubular film from coming into contact with the sleeve.

2. Apparatus for cooling and guiding a continuous tubular thermoplastic synthetic resin film, comprising a sleeve for cooling and guiding a tubular film passing through the sleeve, which sleeve has air intake ports distributed throughout the interior of the sleeve, means for applying suction to each of the intake ports to draw air into the ports, and valve means for balancing the amount of suction applied to the various intake ports to maintain the tubular film centered in the sleeve so as to prevent the tubular film from coming into contact with the sleeve.

3. Apparatus as claimed in claim 2 comprising a support ring, another ring which is vertically spaced from the support ring, one of said rings being rotatable relative to the other, a plurality of flexible conduits, each of which has one end connected to the support ring and its other end connected to said other ring, and each of which is connected to a vacuum pump, said rings and conduits forming a sleeve the minimum diameter of which can be adjusted by relative rotation of said rings to accomodate a tubular film passing through the sleeve, and each of said conduits having inwardly directed intake ports distributed throughout the length of the conduit to draw air into the conduit.

* * * * *